United States Patent [19]

Smith

[11] Patent Number: 4,860,700
[45] Date of Patent: Aug. 29, 1989

[54] TANGENT FLOW CYLINDER HEAD

[75] Inventor: Stephen Smith, Downers Grove, Ill.

[73] Assignee: General Motors Corporation, Detroit, Mich.

[21] Appl. No.: 260,412

[22] Filed: Oct. 20, 1988

[51] Int. Cl.$^4$ .............................................. F01P 1/06
[52] U.S. Cl. ............................. 123/41.31; 123/41.77; 123/41.79; 123/193 CH
[58] Field of Search ............... 123/41.31, 41.77, 41.79, 123/193 CH

[56] References Cited

U.S. PATENT DOCUMENTS

| | | | |
|---|---|---|---|
| 2,000,979 | 5/1935 | Parkhill et al. | 123/41.77 |
| 2,077,225 | 4/1937 | Daiber | 123/41.77 |
| 2,120,344 | 6/1938 | Zahodiakin | 123/41.79 |
| 3,377,996 | 4/1968 | Kotlin et al. | 123/41.31 |
| 3,491,731 | 1/1970 | Dinger et al. | 123/41.31 |
| 4,284,037 | 8/1981 | Kasting et al. | 123/41.31 |

Primary Examiner—E. Rollins Cross
Attorney, Agent, or Firm—Robert J. Outland

[57] ABSTRACT

An internal combustion engine cylinder head includes a lower water jacket chamber with a plurality of angularly spaced exhaust passages extending therethrough. Partition webs connect each of the passage walls with the jacket periphery to separate the jacket chamber into alternate inlet and outlet sections through which coolant flows around each exhaust passage from the inlet to the outlet section. The webs are made tangent to the passage walls on their sides toward their respective outlet sections to avoid forming stagnant pockets for coolant in the outlet section between the passage defining walls and the boundary wall. The webs may also extend tangent to internal stud bosses on their sides toward the inlet sections to also minimize pockets therein.

9 Claims, 3 Drawing Sheets

TANGENT FLOW CYLINDER HEAD

TECHNICAL FIELD

This invention relates to internal combustion engines and, more particularly, to cylinder structure for such engines and, with regard to certain more specific aspects thereof, to a cylinder head for a valve-in-head uniflow scavenged fuel injection engine of the compression ignition type.

BACKGROUND

In its more specific aspects, the present invention relates to cylinder heads of the type disclosed in U.S. Pat. No. 3,377,996, Kotlin et al.

SUMMARY OF THE INVENTION

The present invention provides improvements in arrangement of the cooling jacket structure so as to increase cooling efficiency in the heavily thermally loaded areas of the valve seats by avoiding, or minimizing, the formation of stagnant pockets of coolant between the exhaust passage walls adjacent the valve seats and the coolant jacket periphery. These improvements are accomplished in part by revising the lower water jacket of the cylinder head such that the partition webs between the exhaust passage walls and the peripheral boundary wall lie essentially tangent to the exhaust passage walls on their sides next to the outlet sections of the lower coolant jacket. Preferably, the webs also lie tangent to the stud bosses that extend into the lower coolant jacket on their sides next to the inlet sections thereof. This arrangement has resulted in improved cooling between the valve seats and the peripheral boundary wall.

The foregoing changes, to be hereinafter more fully described, have rendered the cylinder head constructions incorporating them better able to withstand the increased operating temperatures required by higher engine outputs while avoiding thermal distortions of the valve seat.

Further objects and advantages will be apparent from the following description of a preferred embodiment of the invention taken together with the accompanying drawings.

BRIEF DRAWING DESCRIPTION

Figure 2:
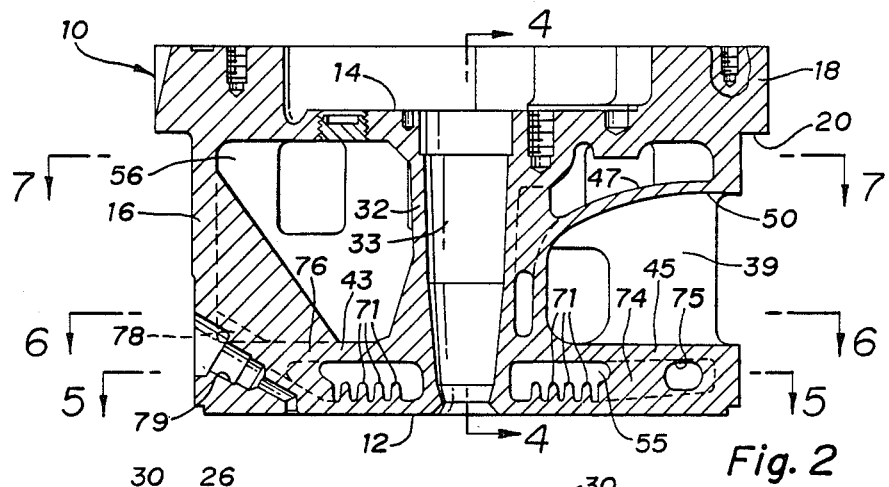
FIGS. 2 and 3 are vertical sectional views taken substantially in the planes of the lines indicated at 2—2 and 3—3 respectively of FIG. 1.
Figure 3:
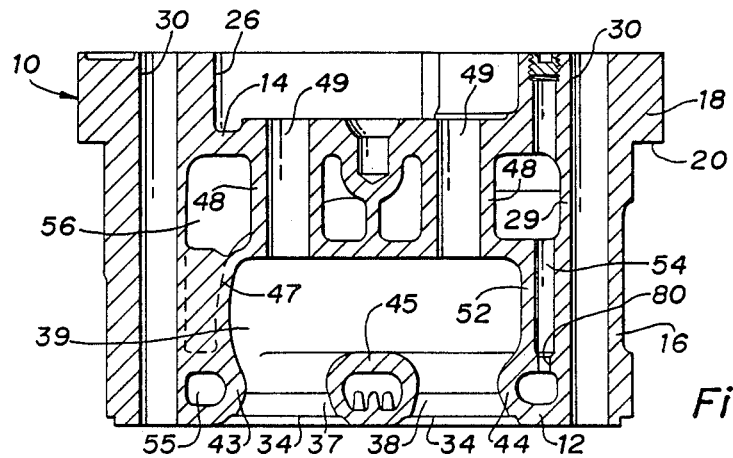
Figures 4, 5:
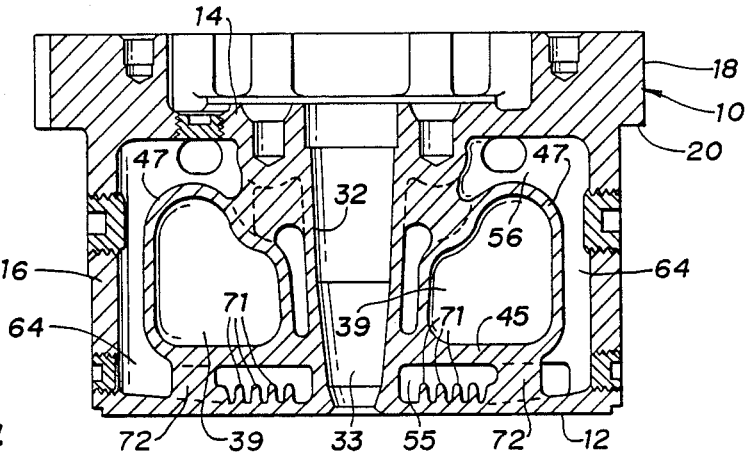
Figure 6:
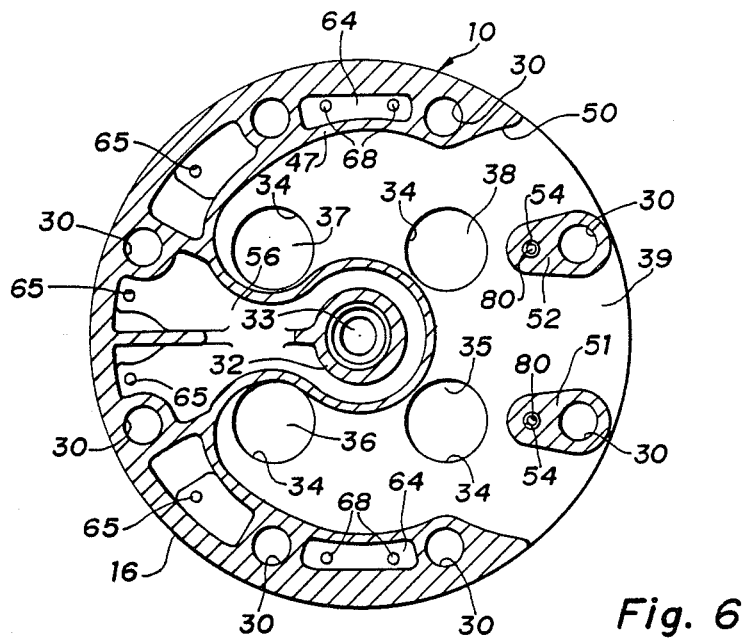
Figure 7:
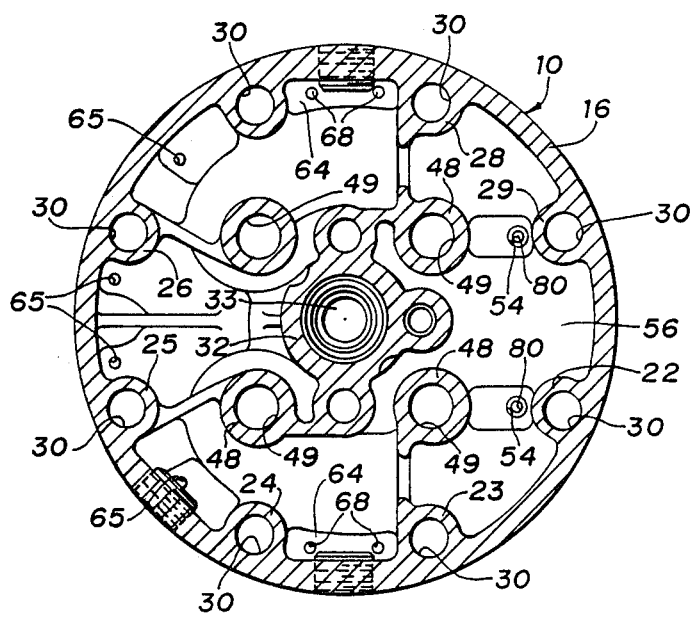

FIG. 4 is a vertical sectional view taken substantially in the plane indicated by the line 4—4 of FIG. 2; and FIGS. 5, 6 and 7 are horizontal sectional views taken substantially in the planes indicated by the lines 5—5, 6—6 and 7—7 respectively of FIG. 2.

DETAILED DESCRIPTION

Referring now to the drawings in detail, numeral 10 generally indicates a cylinder head of the general type shown in U.S. Pat. No. 3,377,996 Kotlin et al, but having significant differences in the cooling water jacket structure as will be subsequently more fully described. The cylinder head embodiment disclosed when assembled with the usual valve mechanism, not shown, is primarily intended for use in a uniflow scavenged two-cycle engine of the fuel injection compression ignition type and is adapted to be secured in end sealing engagement to the upper end of a jacketed liquid cooled cylinder liner and to be mounted therewith in a cylinder mounting bore of an engine frame member wherein the cylinder head 10 cooperates with a piston reciprocably mounted in the liner to define an expansible combustion chamber therebetween.

The cylinder head 10 comprises a lower combustion chamber defining deck or wall 12 engageable outwardly with the upper end of the associated jacketed liner. An upper deck or wall 14 extends in spaced parallel relation to the lower deck and is connected thereto by a peripheral boundary side wall 16. A flange 18 is coextensive with and extends upwardly and outwardly of the upper wall 14 and the side wall 16 to provide an annular shoulder 20. In mounting the cylinder assembly, this flange defined shoulder of the cylinder head is engageable with a mating shoulder provided therefor in the engine frame.

The side wall 16 and flange 18 are structurally reinforced by a plurality of spaced vertically extending bosses 22, 23, 24, 25, 26, 27, 28 and 29. These bosses define a plurality of stud holes 30 which are adapted to receive through studs for securing the cylinder head to the jacketed cylinder liner. The upper and lower decks are interconnected centrally of the head by a sleeve defining wall portion 32. This sleeve defining wall provides a central opening 33 extending through the cylinder head which is of stepped and tapered diameters and is adapted to mount a suitable fuel injection device.

Four valve seat defining exhaust ports 34 extend through the combustion chamber wall 12 of the head in equispaced relation about the injector mounting opening. These exhaust ports communicate upwardly through short branch passages 35, 36, 37 and 38 with a common exhaust passage or chamber 39. The branch passages are defined by wall portions 41, 42, 43 and 44 which extend upwardly between the combustion chamber wall 12 and a horizontal partition wall 45. This partition wall extends inwardly from the side wall 16 in spaced parallel relation above the combustion chamber wall 12 and terminates inwardly at its intersection with the injector mounting tube or wall 32. Four webs or vertical partition walls 46 are provided extending vertically between the lower wall 12 and partition wall 45 and laterally between each of the passage defining walls 41, 42, 43, 44 and the adjacent bosses 23, 24, 27 and 28 respectively which connect with side wall 16.

The arrangement of these partition webs in accordance with the present invention is subsequently more fully described.

The exhaust passage 39 is defined between the partition wall 45 and an upper passage defining wall 47. This upper passage wall is structurally connected to the upper head wall 14 by four tubular or cylindrical wall portions 48 which extend therebetween in axial alignment with the several valve seating ports 34 and define bores 49 adapted to receive suitable valve guide bushings.

As is best seen in FIG. 5, the exhaust passage 39 extends arcuately of the head, partially embracing the injector mounting sleeve in spaced relation thereto and intersecting the several valve controllable branch exhaust passages 35–38, and communicates laterally outwardly with an exhaust outlet port 50 opening through the side wall 16 of the head. This outlet port is connectible to an exhaust manifold through a suitable branch passage which may be provided in the engine frame. The port opening is vertically intersected by two struts 51 and 52. These struts are co-extensive with the stud hole defining bosses 22 and 29 respectively and each has a passage 54 extending therethrough. The passages 54 permit the circulation of a cooling fluid through the gas exposed struts 51 and 52.

It will be seen that the partition and exhaust passage defining walls cooperate with the outer walls of the head to define a coolant-receiving compartment. This compartment is divided by the horizontal partition wall 45 into a lower jacket chamber 55 and an upper jacket chamber 56. The lower chamber 55 is divided by webs 46 into four sections 58, 59, 60 and 61 which are alternately outlet and inlet sections that are interconnected by restricted passages 62 formed between exhaust passage defining wall portions 41, 42, 43 and 44 and the injector mounting sleeve 32.

The upper and lower jacket chambers are interconnected through various openings in partition wall 45 adjacent the inner periphery of side wall 16. The primary connection is through a pair of relatively large passages 64 extending from the outlet sections 58 and 60 of the lower chamber upwardly past the upper exhaust passage wall 47 to the upper chamber. The chambers are also connected through four small openings 65 connecting with inlet section 59 and passages 54 in struts 51 and 52 which connect with inlet section 61 of the lower chamber.

Figure 1:
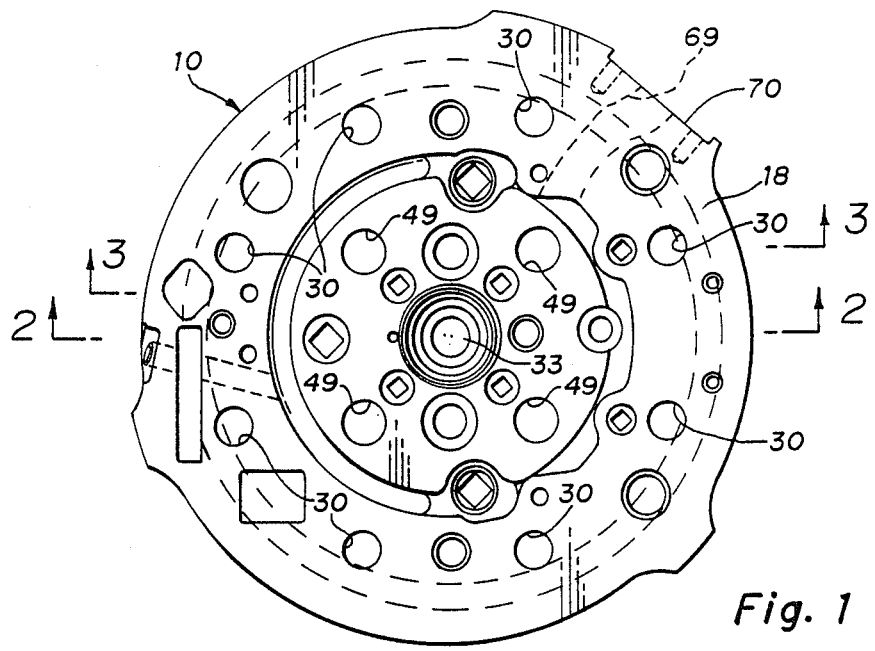
FIG. 1 is a top elevational view of a cylinder head embodying the invention.

The cooling fluid is forced or drawn upwardly into the cylinder head through twelve ports extending through and spaced around the lower head wall 12 adjacent side wall 16. Eight of these are relatively large ports 66 which open into inlet sections 59 and 61 of the lower chamber while four are relatively small ports 68 opening into outlet sections 58 and 60 of the lower chamber. The ports 66 and 68 mate with corresponding ports provided in the jacketed cylinder liner structure which is connected in a conventional manner to the discharge of a coolant circulating pump. As shown in FIG. 1, the upper flange portion 18 has an outlet passage 69 opening inwardly on the upper chamber 56 and outwardly on a machined face 70 thereof. This outlet passage is connectable through a suitable fitting through water outlet manifold to the inlet of the coolant circulating pump in a conventional manner so that forced circulation of coolant through the cylinder head may be provided.

In order to increase cooling efficiency in the critical combustion surface areas of the lower head wall, a plurality of cooling spines 71 are disposed on the inner surface of the lower wall which are distributed among the four sections of the lower chamber over surface area located between the exhaust branch passages 35–38 and extending radially outwardly thereof. Additional web members are provided in the lower chamber for supporting the lower wall, 45 including a pair of radially directed members 72 disposed in sections 58 and 60 and a radially directed member 74 in section 61 which intersects wall 16 and includes an opening 75 for permitting the equalization of coolant flow. Also included is a radial member 76 extending from a diagonal boss 78 which is located in section 59 and encloses a cylinder test passage 79.

The foregoing describes in substantial detail certain features of the preferred embodiment which are similar in construction to the arrangement of the previously mentioned U.S. Pat. No. 3,377,996. In accordance with the improvement of this invention, certain structural changes are made to provide the improved cooling and other benefits resulting from the invention.

As can be seen in FIG. 5, as compared with FIG. 6 of the cited U.S. Pat. No. 3,377,996, the partition webs 46 are modified. The change is such that at the connections of their inner ends with their respective exhaust passage defining walls 41–44, the webs 46 lie tangent to the walls 41–44 on the sides thereof facing toward the outlet sections 58, 60 of the lower jacket chamber 55.

Preferably also, as shown, the outer ends of the webs 46 connect with adjacent ones of the stud bosses, specifically numbers 23, 24, 27 and 28, in a manner such that they also lie tangent to these bosses on their sides facing toward the inlet sections 59, 61 of the lower jacket chamber. These modifications result in more nearly, though not precisely, radial orientations of the webs 46 as compared to the essentially parallel orientations of the prior arrangement in the cited patent.

In operation in an engine of a cylinder head having a coolant jacket as described, the manner and direction of coolant flow is essentially as described in U.S. Pat. No. 3,377,996. Thus, by far, the major portion of the coolant enters the cylinder head through port openings 66 in the inlet sections 59 and 61 of the lower chamber. The closely spaced partition wall 45 directs the coolant inwardly toward the center of the head and it sweeps completely around the peripheries of exhaust passage wall portions 41–44, passes into outlet sections 58 and 60 and out of the lower chamber through passages 64 leading to the upper chamber.

The velocity of the coolant is accelerated due to the constricted passages between the exhaust branch passage walls 41–44 as well as between the injector tube wall 32 and the various branch passage walls. The cooling spines, located between the branch passage walls, further accelerate the flow and increase turbulence to obtain a high degree of scrubbing action and very efficient cooling. The small inlet openings 68, provided in sections 58 and 60, pass a very small percentage of coolant flow into the head and serve to prevent the existence of hot spots in the connected cylinder liner.

Upon passing upwardly through passages 64 into the upper chamber, the coolant sweeps over the exhaust passage defining wall 47 and around the outer peripheries of injector tube 32 and valve guide wall portions 48 before leaving the upper chamber through outlet passage 69. A restricted flow of coolant is also permitted to pass directly from chamber 59 through small openings 65 in partition wall 45 and into the upper chamber. The openings 65 allow removal of coolant from the adjacent portions of the head when the engine cooling system is drained. Likewise, a small flow of coolant is permitted to pass from section 61 of the lower chamber through restrictive openings 80 in passages 54 to cool the struts 51 and 52 as well as prevent stagnation in the upper chamber.

The modified tangential positioning of the partition webs 46 avoids the creation of stagnant pockets of coolant, particularly on the outlet section sides of the webs between the exhaust passage walls 41–44 and the outer peripheral side or boundary wall 16. Thus, the coolant flow entering the outlet sections from the passages 62 is encouraged to flow directly along the surfaces of the webs 46, cooling the metal surfaces by its scrubbing action and avoiding hot spots which might be caused by stagnation if the coolant was directed past recesses or pockets in the jacket construction.

In similar fashion, the tangent connection of the webs with the stud bosses 23, 24, 27, 28 minimizes the formation of pockets on the inlet section sides of the webs and improves the access of coolant to the wall areas adjacent to the coolant inlet ports 66 located toward the edges of the inlet sections. Thus, the tangential web arrangement is believed to improve the cooling action of the flowing coolant on both the inlet and outlet sides of the webs.

While the foregoing description of the invention has been directed to a single preferred embodiment, it should be understood that various changes could be made within the spirit and scope of the inventive concepts described. Accordingly it is intended that the invention not be limited to the described embodiment, but that it have the full scope permitted by the language of the following claims.

The embodiments of the invention in which an exclusive property or privilege is claimed are defined as follows:

1. A cylinder head for an internal combustion engine, said cylinder head defining a coolant receiving jacket compartment and comprising
    a combustion chamber defining wall,
    a cylindrical wall portion adapted to mount a fuel injector extending through said jacket compartment and opening through said combustion chamber defining wall,
    exhaust passage defining walls extending through said jacket compartment and spacedly embracing a portion of said injector mounting wall portion, said passage defining walls terminating in an even number of valve controllable ports opening through the surface of said combustion chamber defining wall in equispaced relation to each other and to the injector mounting opening,
    a partition wall extending transversely through said coolant jacket compartment in closely spaced parallel relation to said combustion chamber defining wall and dividing said jacket compartment into a flow restricting lower jacket chamber and a relatively unrestricted upper jacket chamber, said partition wall connecting with said injector mounting wall and said passage defining walls,
    a plurality of partition webs in said lower jacket chamber, one extending outwardly from each of said passage defining walls and dividing said lower jacket chamber into an even number of sections, comprising alternate inlet and outlet sections, connected by passages between said passage defining walls and said injector mounting wall,
    a plurality of primary coolant inlet openings through said combustion chamber defining wall and opening into said inlet sections of said lower jacket chamber adjacent the periphery thereof, said openings being connectable to the outlet of coolant circulating means,
    primary coolant passage means adjacent the periphery of said jacket compartment and connecting said upper jacket chamber with said outlet sections of said lower jacket chamber,
    a coolant outlet port opening to said upper jacket chamber and connectable to the inlet of coolant circulating means,
    whereby a primary coolant flow path is established into the outer edges of the inlet sections of said lower jacket chamber, around said exhaust passage defining walls and past said fuel injector mounting wall into the outlet sections of said lower jacket chamber, up through the primary coolant passage means adjacent the outer edges of the outlet sections into the upper jacket chamber and out through said coolant outlet port, and
    the improvement wherein said partition webs lie substantially tangent with their respective passage defining walls on the sides thereof toward said outlet sections to avoid the formation of stagnant pockets of coolant in the outlet sections between the passage defining walls and the periphery of said lower jacket chamber.

2. A cylinder head as in claim 1 and further comprising a plurality of small secondary coolant passing openings through said partition wall adjacent the periphery of said jacket compartment and connecting said upper jacket chamber with said inlet sections of the lower jacket chamber for passing a substantially smaller volume of coolant than is passed through said primary coolant passage means.

3. A cylinder head as in claim 3 and further comprising a plurality of restricted secondary coolant inlet ports through said combustion chamber defining wall and opening into said outlet sections of the lower jacket chamber adjacent the periphery thereof, said secondary coolant inlet ports being connectable to the outlet of coolant circulating means and capable of passing a substantially smaller volume of coolant than may be passed through said primary coolant passage means.

4. A cylinder head as in claim 1 and further comprising
    a plurality of fastener opening defining bosses having curved surfaces projecting into the coolant chamber, and the further improvement wherein
    said partition webs each intersect adjacent ones of said bosses and lie tangent to their curved surfaces on the sides thereof toward said inlet sections to also minimize coolant pockets in the inlet sections.

5. In a cylinder head for an internal combustion engine,
    a first combustion chamber defining wall,
    a second wall closely spaced therefrom and defining a coolant chamber therebetween,
    a boundary wall connecting said first and second walls around their edges to enclose said coolant chamber,
    at least two passage defining walls each extending between the first and second walls through the coolant chamber and terminating in a port opening through the first wall,
    a partition web associated with each said passage defining wall and connecting it with said boundary wall to block substantial coolant flow therebetween and divide said coolant chamber into a number of sections equal to the number of said passage defining walls and interconnected only by passages formed between said passage defining walls,
    primary coolant inlet and outlet means connectable to coolant circulating means and opening to different sections comprising, respectively, inlet and outlet sections of said coolant chamber on opposite sides of each said partition web, whereby a substantial portion of the coolant flow from said inlet means is directed around the periphery of each said passage defining wall to said outlet means, and the improvement wherein said partition webs lie substantially tangent with their respective passage defining walls on the sides thereof toward said outlet sections to thereby avoid the formation of stagnant pockets of coolant in the outlet sections between the passage defining walls and the boundary wall.

6. In a cylinder head for an internal combustion engine, a first combustion chamber defining wall, a second wall closely spaced therefrom and defining a coolant chamber therebetween, a boundary wall connecting said first and second walls around their edges to enclose said coolant chamber, an even number of passage defining walls, not less than four, each extending between the first and second walls through the coolant chamber and annularly spaced therein and each terminating in a port opening through the first wall, a partition web associated with each said passage defining wall and connecting it with said boundary wall to block substantial coolant flow therebetween and divide said coolant chamber into a number of sections equal to the number of said passage defining walls and interconnected only by passages formed between said passage defining walls, primary coolant inlet and outlet means connectable to coolant circulating means and opening to different sections comprising, respectively, inlet and outlet sections of said coolant chamber on opposite sides of each said partition web, whereby a substantial portion of the coolant flow from said inlet means is directed around the periphery of each said passage defining wall to said outlet means, and the improvement wherein said partition webs lie substantially tangent with their respective passage defining walls on the sides thereof toward said outlet sections to thereby avoid the formation of stagnant pockets of coolant in the outlet sections between the passage defining walls and the boundary wall.

7. In a cylinder head as in claim 6, a plurality of fastener opening defining bosses extending inward from said boundary wall and having curved surfaces projecting into the coolant chamber, and the further improvement wherein said partition webs each intersect adjacent ones of said bosses and lie tangent to their curved surfaces on the sides thereof toward said inlet means to also minimize coolant pockets in the inlet sections.

8. In a cylinder head as in claim 6, a component receiving wall disposed centrally of said passage defining walls and extending between said first and second walls through the coolant chamber, said component receiving wall terminating in a port opening through said first wall whereby coolant flow around said passage defining walls also cools said component receiving wall.

9. In a cylinder head as in claim 8, a plurality of cooling spines projecting upwardly from from the coolant chamber surface of said first wall and disposed between adjacent passage defining walls to increase the cooling efficiency at said locations.

* * * * *